Oct. 14, 1958    R. E. ALLISON    2,856,583
SOUND LEVEL METER ATTENUATOR SYSTEM
Filed Oct. 28, 1954    2 Sheets-Sheet 1

RALPH E. ALLISON,
INVENTOR.

BY
Hazard & Miller
ATTORNEYS

RALPH E. ALLISON,
INVENTOR.

BY

Hazard & Miller
ATTORNEYS

United States Patent Office 2,856,583
Patented Oct. 14, 1958

2,856,583
SOUND LEVEL METER ATTENUATOR SYSTEM

Ralph E. Allison, Puente, Calif., assignor to Patent Management, Incorporated, Minneapolis, Minn., a corporation of Minnesota Application October 28, 1954, Serial No. 465,235

4 Claims. (Cl. 324—115)

This invention relates to improvements in sound level meter attenuator systems.

Explanatory of the present invention, the typical or conventional sound level meters that are now in general use have two attenuators operable in conjunction with the meter. One of these attenuators is used with the meter to measure the overall noise in decibels above .0002 dyne per square centimeter. The second attenuator which is located in the analyzer circuit is used to indicate how many decibels down or below the overall measurement that a component of the noise possesses. In other words, the analyzer attenuator together with the meter is used to measure in dynes per square centimeter a selected component of the overall noise. The conventional meter that is used in conjunction with the attenuators has a range from —6 decibels to plus 10 decibels and when a reading either on the overall attenuator or on the analyzing attenuator is made the meter reading which may be either a plus reading or a minus reading as above explained, is added to the attenuator reading. For example, if the overall attenuator reading was 90 decibels and the meter reading was —2 decibels, these two figures would be added together giving the result of 88 decibels overall noise level. In determining the analyzer reading it has heretofore been necessary to take the analyzer attenuator reading which might be any number from zero —10, —20, —30, —40, or —50 and adding thereto the meter reading which, as above explained, might be anywhere from —6 to plus 10. These two figures, after being added, are subtracted from the overall noise measurement which was previously determined as above explained. If the analyzer attenuator under a given set of circumstances read —20 and the meter reading was —2, this would give an analyzer reading of —22. The —22 would then be subtracted from the 88 overall noise reading determined as above explained, and the result of 66 decibels was thus obtained.

In view of the fact that as many as six or eight analyzer readings are made for each overall reading and the operator of this type of equipment is apt to be making these measurements over prolonged periods of time, it becomes very desirable to make the measurement as simple as possible. As above explained, under certain circumstances a plus reading may be added to the overall attenuator reading or a minus meter reading may be subtracted from the overall attenuator reading. Similarly, a minus reading may be added to the analyzer attenuator reading or a plus meter reading may be subtracted from the analyzer attenuator reading. The number of possible variations for a given set of circumstances is conducive to error.

By arranging the overall attenuator and the anlyzer attenuator so that the overall attenuator determines the dial reading point for the anlyzer attenuator knob it is possible to make the analyzer read the analyzer level in a selected band directly in sound pressure with reference to .0002 dyne per square centimeter.

It is therefore a primary object of the present invention to provide an improved sound level meter attenuator system which enables such simplified readings to be obtained and which will in use eliminate the possibility of error.

With the foregoing and other objects in view, which will be made manifest in the following detailed description and specifically pointed out in the appended claims, reference is had to the accompanying drawings for an illustrative embodiment of the invention, wherein:

Figure 1:
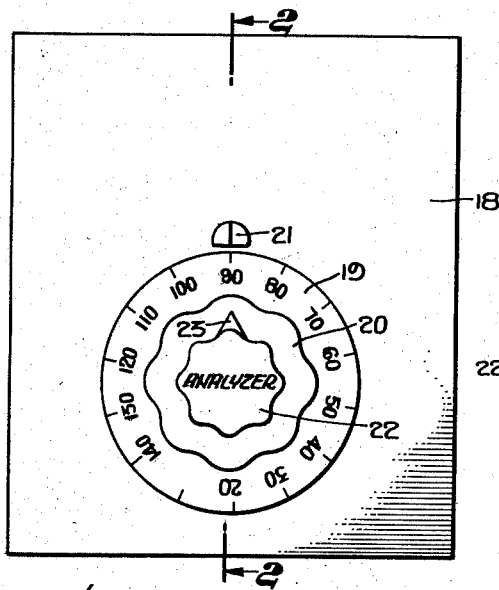
Figure 1 is a view in front elevation of one form of sound level meter attenuator system embodying the present invention.
Figure 2:
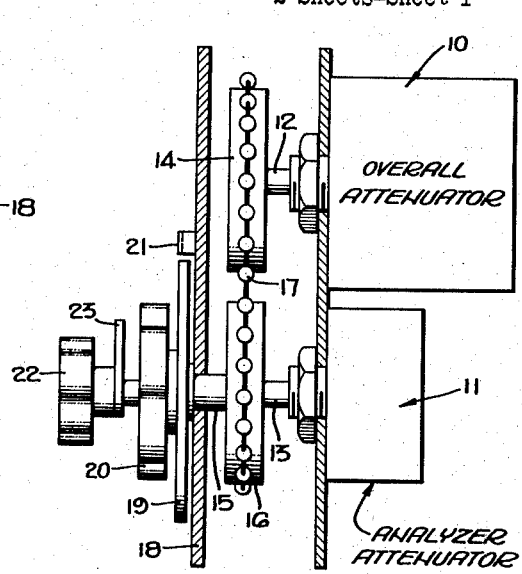
Fig. 2 is a vertical section taken substantially upon the line 2—2 upon Fig. 1.

Referring to the accompanying drawings wherein similar reference characters designate similar parts throughout, and referring first to that form of construction shown in Figs. 1 and 2, 10 indicates the overall attenuator of the system and 11 the analyzer attenuator. The overall attenuator 10 is varied or adjusted by means of a rotary shaft 12 and similarly the analyzer attenuator 11 is adjusted by a rotary shaft 13. On the shaft 12 there is a sprocket 14 and on the shaft 13 there is a sleeve 15 on which there is a sprocket 16. The two sprockets 14 and 16 are connected by a chain 17 so that whenever the sleeve 15 is rotated the shaft 12 will be rotated thereby. On the forward end of the sleeve 15 and in front of the panel 18 there is a dial 19 which is suitably graduated. This dial has a knob or handle 20 rigidly associated therewith so that the dial can be rotated to traverse an index point 21 mounted on the panel. When the dial is rotated the sleeve 15 is rotated thereby and by means of the chain and sprocket drive the shaft 12 will be rotated to adjust the overall attenuator 10.

The shaft 13 for the analyzer attenuator 11 extends through the sleeve, through the dial, and through the knob 20 and is equipped with a knob 22 by which it may be rotated to adjust the analyzer attenuator. This knob has an index or pointer 23 which is arranged to point to figures of the graduations on the dial 19.

Figure 7:
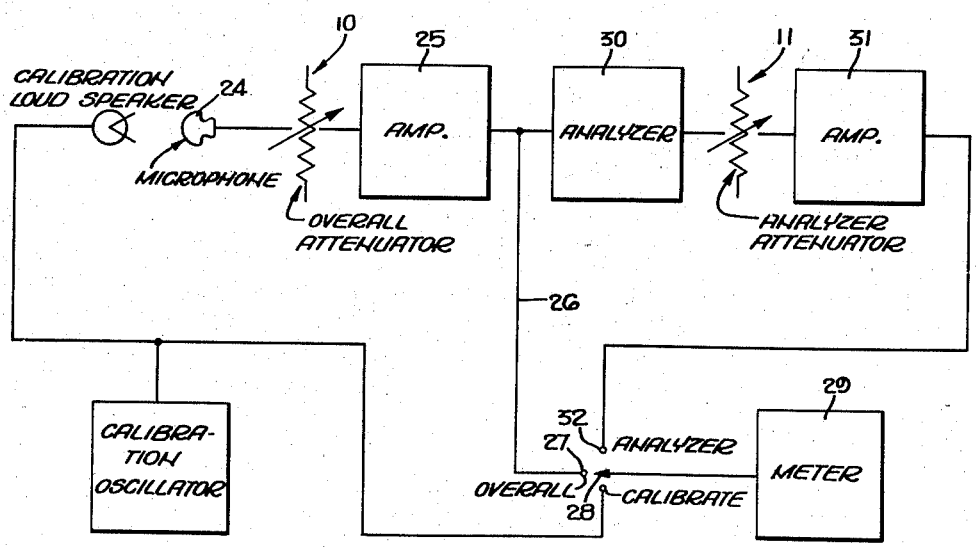
Fig. 7 is a wiring diagram of the essentials of the system.

Referring to Fig. 7, which is a wiring diagram, may be regarded as being in common with all forms of the invention. The electrical path from the microphone 24 adjusted by a rotary shaft 13. On the shaft 12 there is and then through line 26 to a contact 27 engageable by a selector switch 28 that is connected to the meter 29. The analyzer circuit includes the analyzer 30 which transmits only those frequencies of a selected band to the analyzer attenuator 11. From the analyzer attenuator the path extends through amplifier 31 and to a contact 32 engageable by the selector switch 28.

The principal requirement in this hookup is that the overall noise attenuator value controls the analyzer attenuator readings. Another requirement for producing my improved result is that the amplifier system in the analyzer circuit have zero gain when the position of the pointer or index 23 on the analyzer knob 22 points to the same number on the dial 19 when that number is opposite the index 21. For example, to offset a loss which occurs in the analyzer circuit, the amplifier 31 should produce a resultant zero gain in the analyzer circuit when pointer 23 is pointing to 90 on the dial 19 and the figure 90 on the dial 19 is opposite the index 21. If the reading is such that the graduation 90 on the dial 19 must be positioned opposite the index 21 and the meter 29 gives a reading of —2, these two figures can be added together to give an overall indication of 88 decibels. I have found it simpler and more advisable to subtract or add the loss or gain indicated by the meter reading than to adjust the analyzer attenuator to bring the meter to zero. In the illustration above given the selected band had a level of 66 db. By means of the present construction this would be determined by rotating the knob 22 to the figure 60 on the dial 19 without disturbing the position of the dial. When so rotated and the selector switch 28 is connected to the contact 32, the meter 29 would give a reading of plus 6. In the alternative the pointer 23 might be rotated to a position opposite the graduation 70 in which case the meter would give a reading of —4.

It will be appreciated from the above-described construction that as the analyzer control knob 22 traverses the dial that has been set for the overall noise attenuator reading that a great deal of addition and subtraction can be eliminated in that the sound level of the selected band can be read directly by the pointer 23 against the dial for the overall noise attenuator coupled with the reading on the meter 29.

Figure 3:
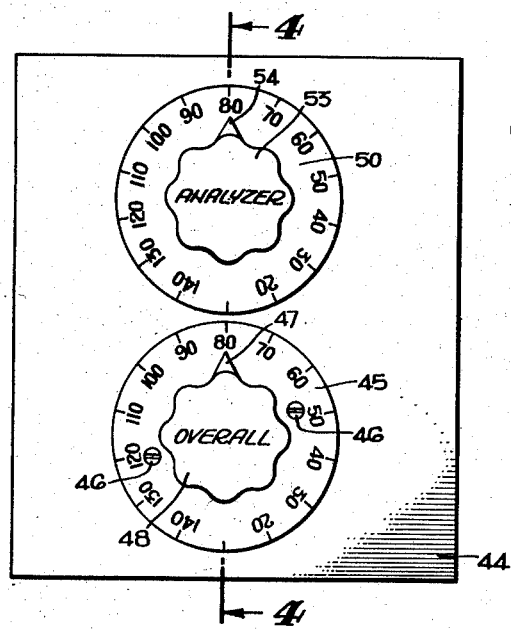
Fig. 3 is a front view in elevation of another system embodying the present invention.
Figure 4:
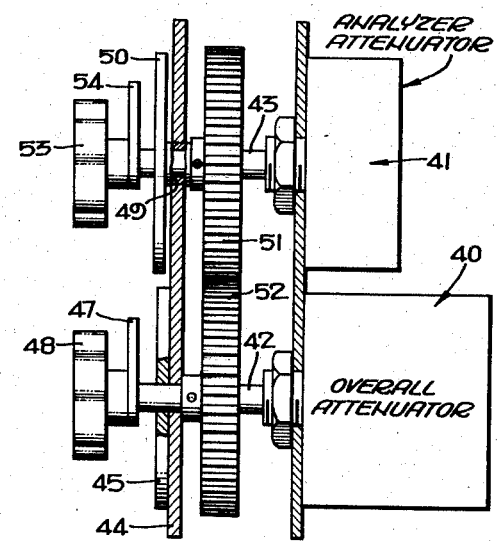
Fig. 4 is a sectional view taken substantially upon the line 4—4 upon Fig. 3.

In that form of construction illustrated in Figs. 3 and 4 the overall noise attenuator is indicated at 40 and the analyzer attenuator is indicated at 41. Each of these attenuators is adjustable by its shaft 42 and 43, respectively. On the forward side of the panel 44 there is an overall noise attenuator dial 45. This dial is stationarily mounted on the panel such as by screws 46. It is traversed by the pointer or index 47 on the overall noise attenuator knob 48 which is rigidly mounted on the shaft 42. On the shaft 43 there is a sleeve 49 and this sleeve extends through the panel 44 and carries a dial 50. The sleeve 49 is gearedly connected to the shaft 42, such as by gears 51 and 52. On the forward end of the shaft 43 which extends through the sleeve there is an analyzer attenuator adjusting knob 53 carrying an index or pointer 54 arranged to traverse the figures on the dial 50. In this form of construction it will be appreciated that in determining overall noise level it is merely necessary to adjust the overall noise attenuator by means of its knob 48. The overall noise level is determined by reading the dial 45 opposite the index 47 and coupling this with the meter reading. However, by means of the geared connection between the shaft 42 and the sleeve 49, the dial 50 will be caused to rotate commensurately with the rotation of the knob 48. Consequently, for a particular position of the knob 48 the dial 50 will assume a corresponding position, and as it is assumed that the amplifier 30 will have a zero gain when the pointer 54 is opposite the number on the dial 50 against which the index 47 is opposite on the dial 45, the sound level of the selected band can be read directly on the dial 50 opposite the index 54, this reading of course being coupled with the meter reading.

Figure 5:
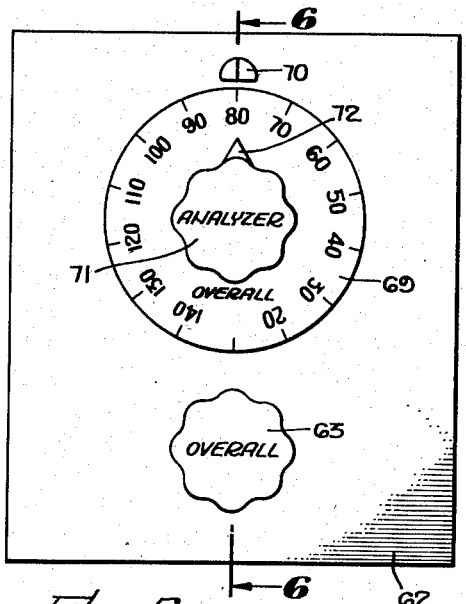
Fig. 5 is a front view in elevation of still another form of construction embodying the present invention.
Figure 6:
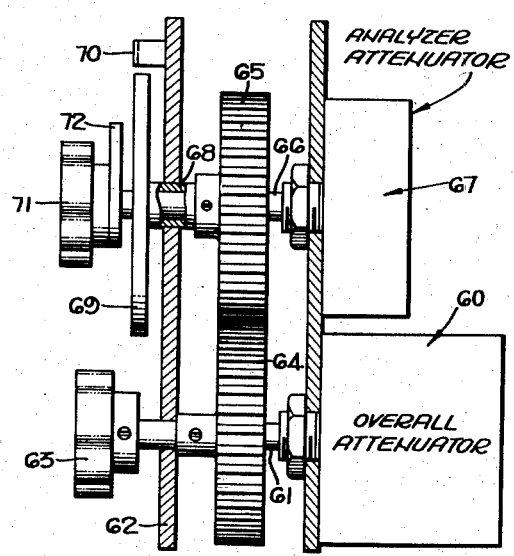
Fig. 6 is a sectional view taken substantially upon the line 6—6 upon Fig. 5.

In the construction shown in Figs. 5 and 6, the overall noise attenuator is indicated at 60 and is adjusted by the rotary shaft 61 which extends through the panel 62 and is equipped with a knob 63 by which the overall noise attenuator may be adjusted. On the shaft 61 there is a gear 64 which meshes with a gear 65 on the shaft 66 that adjusts the analyzer attenuator 67. The gear 65 is rotatable on the shaft 66 and is equipped with a sleeve 68 that extends through the panel and which is equipped with a dial 69. This dial will consequently be rotated by the overall noise attenuator knob 63 whenever this knob is turned. The overall noise reading is obtained by reading the graduations on the dial 69 against the index 70. The analyzed attenuator is adjusted by the knob 71 which is mounted on the shaft 66 and has an index on pointer 72 arranged to also traverse the figures on the dial 69 when the dial has been caused to assume an adjusted position by means of the overall noise attenuator knob 63.

In all forms of construction above described, it will be appreciated that a dial is rotatably adjusted by the overall noise attenuator knob in determining overall sound level. This dial having once been adjusted for the purpose of determining overall sound level is also traversed by an index or pointer on the knob for the analyzer attenuator. This enables the sound level of a selected frequency band to be instantly and immediately read by the index on the analyzer attenuator knob and its relationship to the dial that has been adjusted by the overall noise attenuator knob. Modifications, either plus or minus by adding or subtracting the reading from the meter 29 are obtained.

It will thus be appreciated that it is unnecessary to add the meter reading obtained from the meter 29 to an analyzer attenuator reading and then subtract this sum from the overall sound level reading. In lieu thereof a direct reading is obtainable by reading the position of the analyzer knob index against the adjusted dial.

Various changes may be made in the details of construction without departing from the spirit and scope of the invention as defined by the appended claims.

I claim:

1. A sound level meter attenuator system comprising a circuit including a variable overall noise attenuator having an adjustment knob, a variable analyzer attenuator having an indicator dial, the knob of the overall attenuator and the dial of the analyzer attenuator being coupled whereby movement of the knob of the overall attenuator will move the dial of the analyzer attenuator, means for indicating the position of adjustment of the analyzer attenuator in reference to the moved dial, and metering means connected to said attenuators to measure their output.

2. A sound level meter attenuator system comprising a circuit including a variable overall noise attenuator and a variable analyzer attenuator, means for adjusting the overall attenuator having a scale movable therewith, means for adjusting the analyzer attenuator having a pointer movable therewith and arranged to indicate on the scale in the position to which the scale is adjusted in adjusting the overall attenuator, and metering means for measuring the output of said attenuators.

3. A sound level meter attenuator system comprising a circuit including a variable overall attenuator and a variable analyzer attenuator, means for adjusting each attenuator independently of the other, metering means for measuring the outputs of said attenuators, the adjusting means for the overall attenuator having a dial movable therewith and the adjusting means for the analyzer attenuator having a pointer movable therewith arranged to indicate in reference to the dial in the adjusted position of the dial.

4. A sound level meter attenuator system comprising a circuit including two variable attenuators with means for measuring the output of each, a dial movable in accordance with the adjustment of one attenuator, and a pointer movable in accordance with the adjustment of the other attenuator arranged to indicate in reference to the dial the position to which the pointer has been moved.

References Cited in the file of this patent

UNITED STATES PATENTS

| Number | Name | Date |
|---|---|---|
| 1,275,786 | Stuart | Aug. 13, 1918 |
| 1,371,371 | Hinsman | Mar. 15, 1921 |
| 1,613,423 | Wegel | Jan. 4, 1927 |
| 2,156,199 | Smith | Apr. 25, 1939 |